United States Patent
Yan

(10) Patent No.: US 7,184,284 B2
(45) Date of Patent: Feb. 27, 2007

(54) CLOSED-LOOP HIGH VOLTAGE BOOSTER

(75) Inventor: Hai Yan, Covina, CA (US)

(73) Assignee: Micron Technology, Inc., Boise, ID (US)

( * ) Notice: Subject to any disclaimer, the term of this patent is extended or adjusted under 35 U.S.C. 154(b) by 325 days.

(21) Appl. No.: 10/811,995

(22) Filed: Mar. 30, 2004

(65) Prior Publication Data

US 2005/0219876 A1    Oct. 6, 2005

(51) Int. Cl.
*H02M 3/18*    (2006.01)
*G05F 1/00*    (2006.01)

(52) U.S. Cl. ............................. 363/59; 363/60
(58) Field of Classification Search ................. 363/59, 363/60; 365/149, 174, 226, 227; 327/536, 327/537
See application file for complete search history.

(56) References Cited

U.S. PATENT DOCUMENTS

| | | | |
|---|---|---|---|
| 5,781,426 A | 7/1998 | Matsushita | |
| 6,580,287 B2 | 6/2003 | Hsu et al. | |
| 6,614,705 B2 * | 9/2003 | Foss et al. | 363/60 |
| 6,898,126 B1 * | 5/2005 | Yang et al. | 365/185.26 |

* cited by examiner

*Primary Examiner*—Matthew V. Nguyen
(74) *Attorney, Agent, or Firm*—Dickstein Shapiro LLP

(57) ABSTRACT

A voltage boosting circuit with a closed-loop control mechanism and a controllable slew rate. A tracking capacitor and a control current form the closed-loop and are used to adjust the slew rate of the boosting circuit. The closed-loop control and adjustable slew rate improve the accuracy and predictability of the boosting circuit's final boosted output voltage.

36 Claims, 8 Drawing Sheets

CLOSED-LOOP HIGH VOLTAGE BOOSTER

FIELD OF THE INVENTION

The invention relates generally to voltage boosting circuits and more particularly to a closed-loop high voltage boosting circuit.

BACKGROUND

There are many circuit applications requiring a boosted voltage (i.e., a voltage boosted above a predetermined operating voltage level for the circuit) to ensure that the circuit operates as intended even though there may have been unknown process, operating voltage or temperature variations. The boosted voltage is typically generated by a voltage boosting circuit, which is also sometimes referred to as a voltage booster.

FIG. 1 illustrates a conventional boosting circuit 10. The illustrated boosting circuit 10 includes a pre-charge circuit 12, boosting capacitor 14, parasitic capacitor 16 and a load capacitor 18. A positive electrode of the boosting capacitor 14 is connected to the pre-charge circuit 12. A negative electrode of the boosting capacitor 14 is connected to receive a boost voltage Vboost used to boost-up the pre-charge voltage. The parasitic and a load capacitors 16, 18 are connected to a node between the connection of the positive electrode of the boosting capacitor 14 and the pre-charge circuit 12.

In operation, to generate a high boosted final output voltage Vfinal, the boosting capacitor 14 is pre-charged to a predetermined voltage (Vprecharge) by the pre-charge circuit 12. The voltage at the negative electrode of the boosting capacitor 14 is then raised to a higher voltage (e.g., Vboost) so that a voltage appearing at the positive electrode of the boosting capacitor 14 is higher than the pre-charge voltage.

Because the parasitic capacitor 16 and the load capacitor 18 share the charges of the boosting capacitor 14, the final boosted voltage Vfinal will be less then the Vprecharge+Vboost voltages applied to the boosting capacitor 14. That is, $$Vfinal = Vprechage + \frac{C\_boosting}{(C\_boosting + C\_parasitic + C\_load)} \times Vboost, \quad (1)$$

where C_boosting is the capacitance of the boosting capacitor 14, C_parasitic is the capacitance of the parasitic capacitor 16, and C_load is the capacitance of the load capacitor 18.

The prior art boosting circuit 10 has some drawbacks. For example, in the situations when the capacitances of the parasitic and load capacitors 16, 18 cannot be precisely calculated, the final boosted voltage Vfinal cannot be accurately predicted. Furthermore, any undesired leakage current at the positive electrode of the boosting capacitor 14 will cause charge loss and will change the expected final boosted voltage Vfinal. In addition, any unwanted capacitive coupling to the positive electrode of the boosting capacitor 14 will also alter/lower the final boosted voltage Vfinal. All of these drawbacks are undesirable.

Accordingly, there is a desire and need for a voltage boosting circuit in which the accuracy of the boosting circuit (with respect to the final boosted voltage) is ensured and predictable and does not suffer from the drawbacks found in the prior art boosting circuits (e.g., boosting circuit 10).

SUMMARY

The invention provides a voltage boosting circuit having an accurate and predictable boosted output voltage.

The above and other features and advantages are achieved in various exemplary embodiments of the invention by providing a voltage boosting circuit with a closed-loop control mechanism and a controllable slew rate. A tracking capacitor and a control current form the closed-loop and are used to adjust the slew rate of the boosting circuit. The closed-loop control and adjustable slew rate improve the accuracy and predictability of the boosting circuit's final boosted output voltage.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

Figure 1:
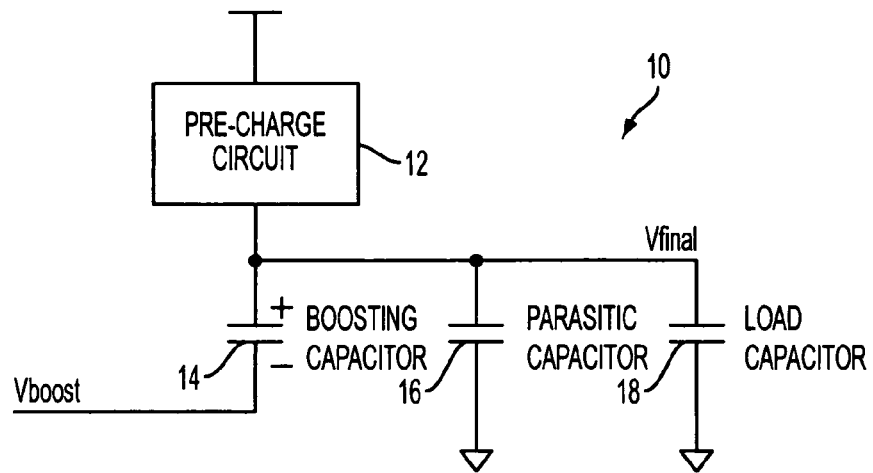
FIG. 1 is a circuit diagram illustrating a conventional boosting circuit.
Figure 2:
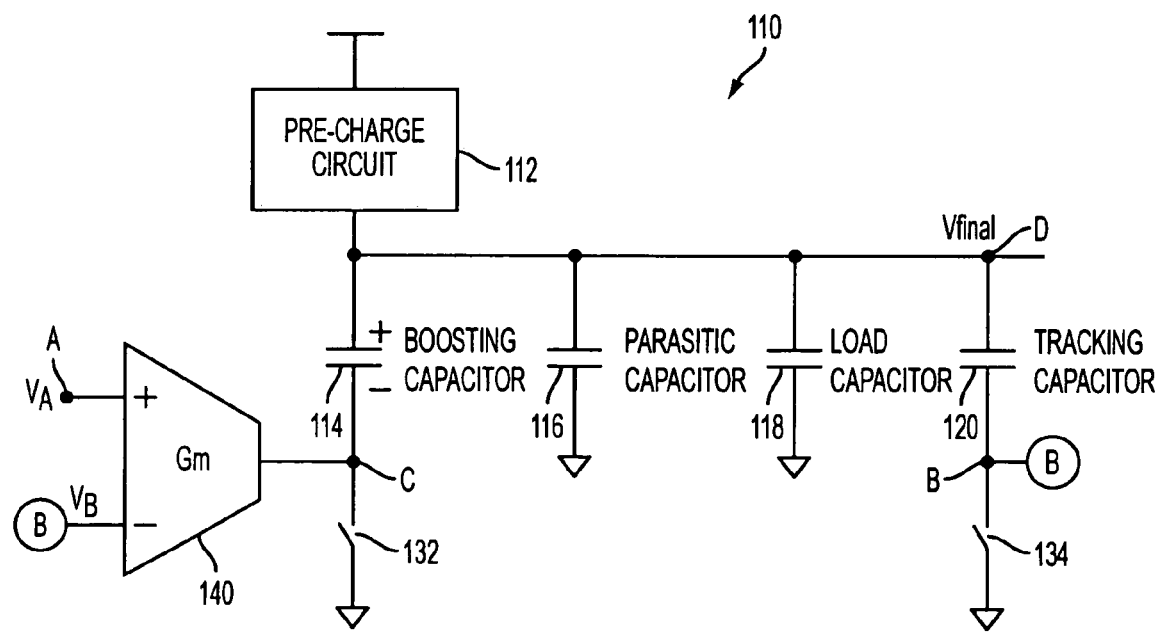
FIG. 2 is a circuit diagram illustrating an exemplary closed-loop high voltage boosting circuit constructed in accordance with an exemplary embodiment of the invention.

Referring to the figures, where like reference numbers designate like elements, FIG. 2 shows an exemplary closed-loop high voltage boosting circuit 110 constructed in accordance with an exemplary embodiment of the invention. The illustrated boosting circuit 110 includes a pre-charge circuit 112, boosting capacitor 114, parasitic capacitor 116, load capacitor 118, tracking capacitor 120, two switches 132, 134 and a voltage-to-current converter 140.

A positive electrode of the boosting capacitor 114 is connected to the pre-charge circuit 112. A negative electrode of the boosting capacitor 114 is connected to receive an output from the voltage-to-current converter 140 at node C. The parasitic, load and tracking capacitors 116, 118, 120 have one terminal connected to node D, which is connected to the connection between the positive electrode of the boosting capacitor 114 and the pre-charge circuit 112. The other terminals of the parasitic and load capacitors 116, 118 are connected to a ground potential. The tracking capacitor 120 has its second electrode connected at node B. The first switch 132 is connected between a ground potential and node C. The second switch 134 is connected between a ground potential and node B. 22 A first input of the voltage-to-current converter 140 is connected to a reference voltage Va. The reference voltage Va sets the desired amount of voltage boost (Vboost). The second terminal of the voltage-to-current converter 140 is connected to node B and thus, inputs the voltage Vb present at node B. The voltage-to-current converter 140 outputs a current to node C based on the relationship (Va−Vb)×Gm, where Gm is a factor (e.g., transconductance) controlled by a current source 142 (described below with respect to FIG. 3) within the converter 140. 23 When the circuit 110 is operated in a pre-charge phase, the two switches 132, 134 are closed. The boosting, parasitic, load and tracking capacitors 114, 116, 118, 120 are pre-charged to a predetermined voltage (Vprecharge) by the pre-charge circuit 112.

When the circuit 110 is operated in a boosting phase, the two switches 132, 134 are opened. At this point, the pre-charge circuit 112 stops pre-charging the capacitors 114, 116, 118, 120. The reference voltage Va and the voltage Vb at node B are "compared" in the voltage-to-current converter 140. This forms the closed-loop feedback control of the circuit 110.

When the voltage Vb at node B is less than the reference voltage Va, the voltage-to-current converter 140 outputs a current to node C that raises the voltage at the negative electrode of the boosting capacitor 114. This raises the final output voltage Vfinal at node D. The voltage Vb at node B is also raised because the voltage difference across the tracking capacitor 120 is fixed to be the pre-charge voltage Vprecharge when its corresponding switch 134 is opened. Under the control of the closed-loop feedback, the voltage Vb at node B is raised until Vb equals the reference voltage Va (i.e., the point were no current is output from the voltage-to-current converter 140).

In the situations when the voltage Vb at node B is larger than the reference voltage Va, the closed-loop feedback reduces the voltage Vb at node B (via the converter 140) until Vb equals the reference voltage Va. After the circuit 110 reaches a stable state, the final boosted output voltage Vfinal is:

Vfinal=Vprecharge+Va.    (2)

Thus, the accuracy of the final boosted voltage Vfinal is ensured by the closed-loop gain.

Figure 3:
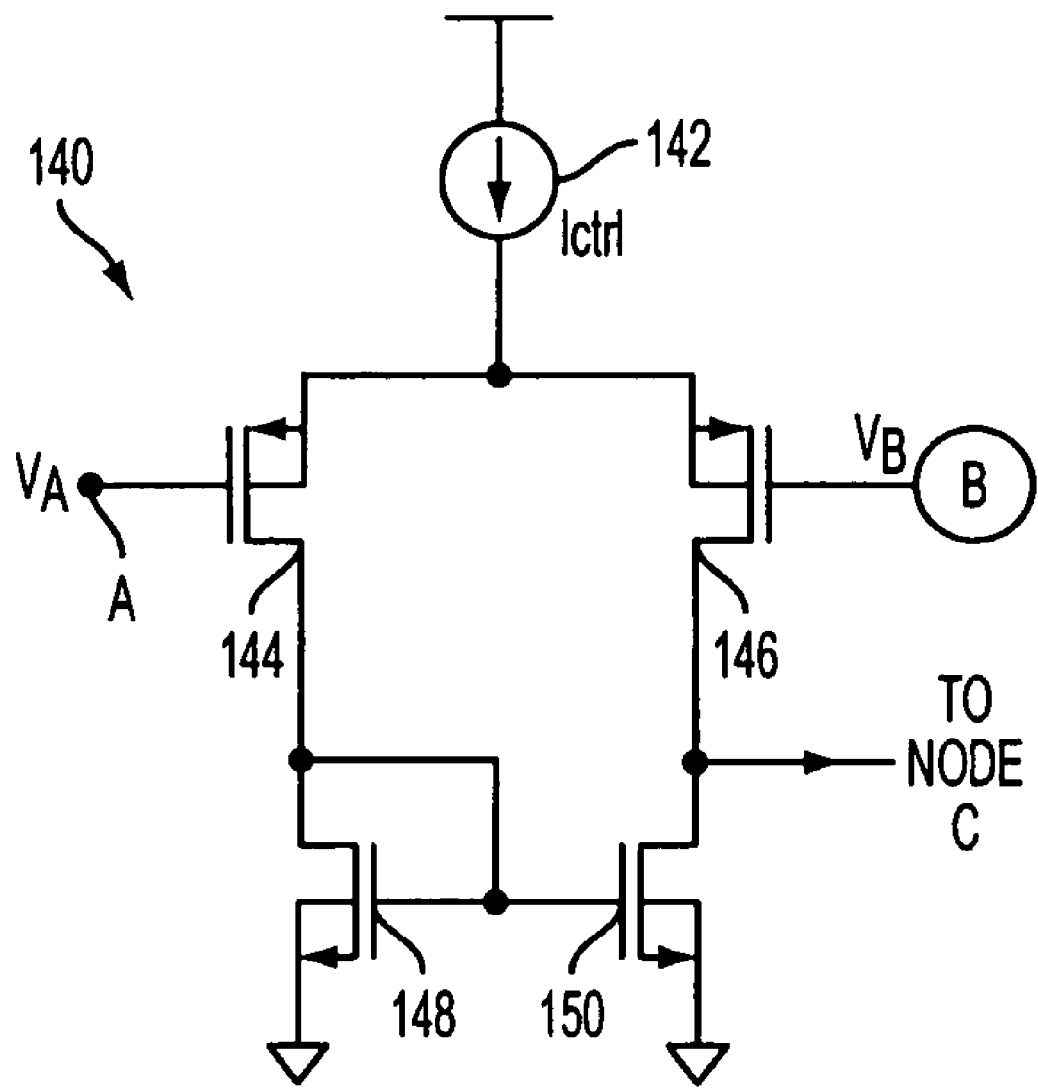
FIG. 3 is a circuit diagram of an exemplary voltage-to-current converter used by the boosting circuit illustrated in FIG. 2.

FIG. 3 is a circuit diagram of an exemplary voltage-to-current converter 140 used by the boosting circuit 110 illustrated in FIG. 2. The illustrated voltage-to-current converter 140 includes a current source 142, two p-channel transistors 144, 146 and two n-channel transistors 148, 150.

The first p-channel transistor 144 is connected between the first n-channel transistor 148 and the output of the current source 142. The first p-channel transistor 144 has its gate connected to the reference voltage Va. The second p-channel transistor 146 is connected between the second n-channel transistor 150 and the output of the current source 142. The second p-channel transistor 146 has its gate connected to the voltage Vb at node B.

The first n-channel transistor 148 is connected between a ground potential and the first p-channel transistor 144. The second n-channel transistor 150 is connected between a ground potential and the second p-channel transistor 146. The gates of the two n-channel transistors 148, 150 are connected to each other and are also connected to the connection between the first n-channel transistor 148 and the first p-channel transistor 144. With this configuration, the circuit 140 includes a common-source differential-input transistor pair with a single-ended current output controllable by the current source 142.

In operation, when the reference voltage Va is larger than the voltage Vb at node B, an outgoing current is output to node C. When the reference voltage Va is less than the voltage Vb at node B, a current is output from node C in an opposite direction from the outgoing current. The magnitude of the current is approximately proportional to the voltage difference between Va and Vb when the difference is small. When Va is significantly larger than Vb, however, the output current at node C is limited by the current source 142 current Ictrl. Thus, by adjusting the current source 142 to have different control currents Ictrl, the rising time of the final boosted voltage Vfinal can be controlled (discussed below in more detail with respect to FIGS. 4 and 5).

An additional advantage of the closed-loop boosting circuit 110 of the invention is that the circuit 110 can still achieve a desired boosted output voltage Vfinal even if there is current leakage or capacitive coupling to Node D (where Vfinal is present). This advantage is achieved because the closed-loop control tends to recover to the stable state, where Vfinal=Vprecharge+Va even when there is current leakage or capacitive coupling to Node D.

Figure 9:
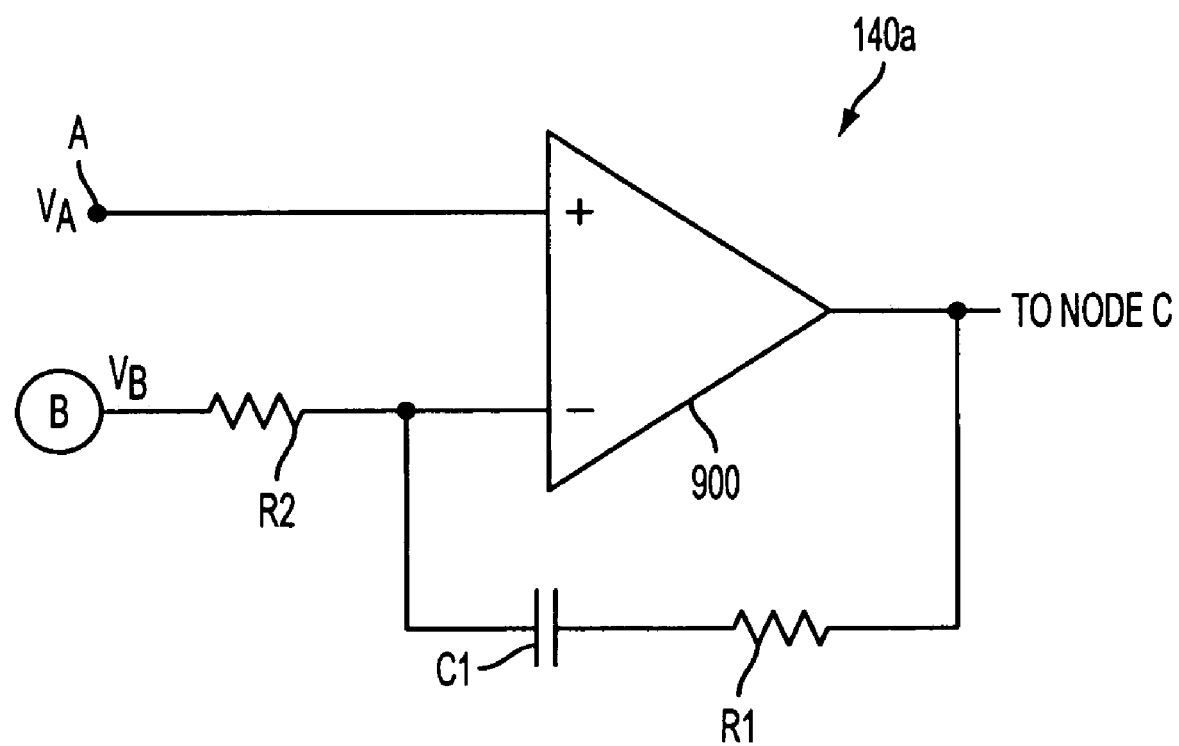
FIG. 9 is a circuit diagram of another exemplary circuit used by the boosting circuit illustrated in FIG. 2.
Figure 10:
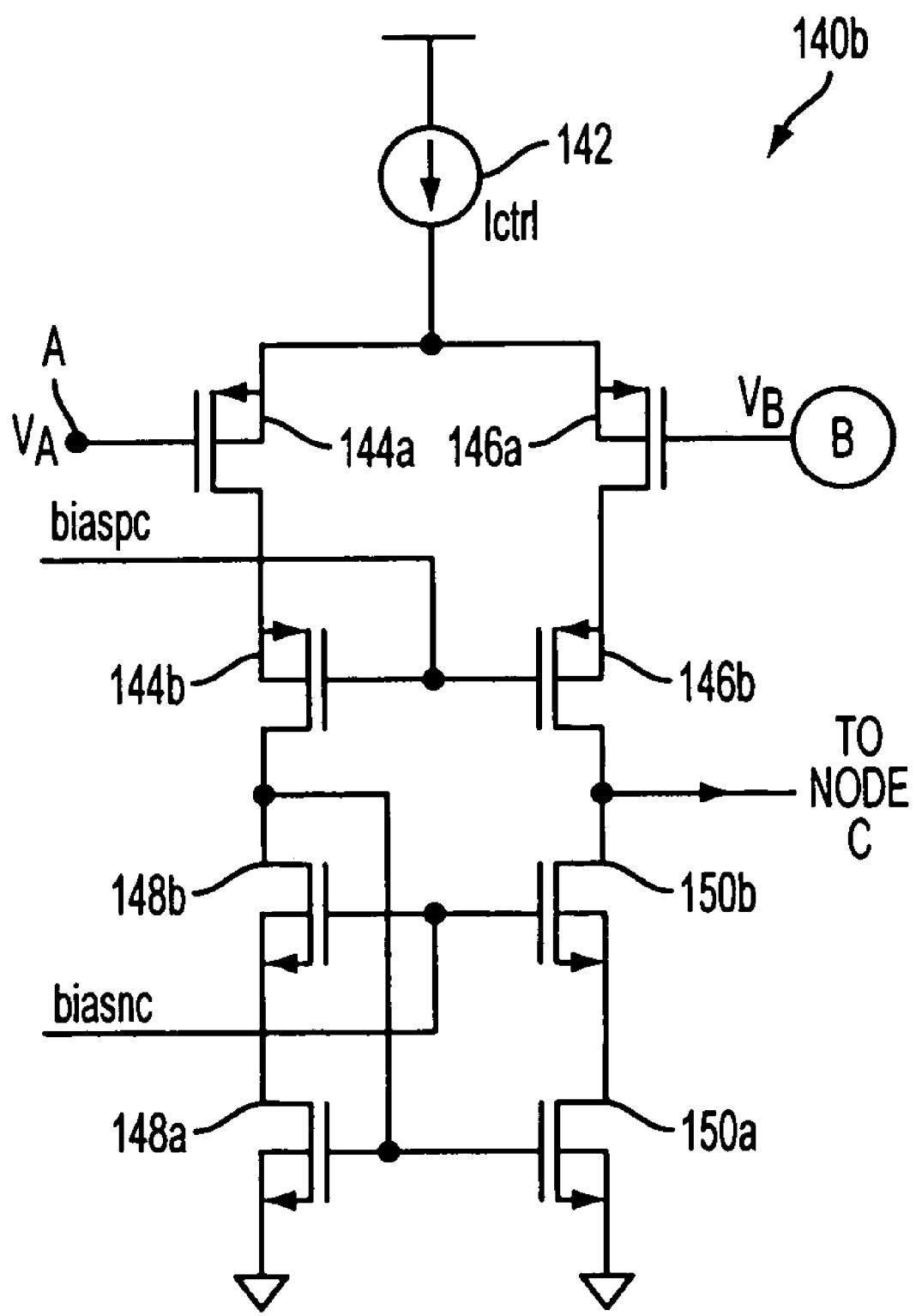
FIG. 10 is a circuit diagram of another exemplary voltage-to-current converter used by the boosting circuit illustrated in FIG. 2.

In another exemplary embodiment of the invention, the voltage-to-current converter 140 is replaced by an operational amplifier 900 configured as an integrator 140a (FIG. 9). In yet another exemplary embodiment of the invention, the transistors 144, 146, 148, 150 are replaced by a cascaded transistor arrangement with proper biasing to improve the performance of the circuit 140 (e.g., power rejection ratio, output impedance). For example, as shown in FIG. 10, in another embodiment of the converter circuit 140a, the first p-channel transistor 144 is replaced by two p-channel transistors 144a, 144b, the second p-channel transistor 146 is replaced by two more p-channel transistors 146a, 146b, the first n-channel transistor 148 is replaced by two n-channel transistors 148a, 148b, and the second n-channel transistor 150 is replaced by two more n-channel transistors 150a, 150b. A p-channel bias BIASPC is applied to the p-channel portion of the circuit 140b at p-channel transistors 144b, 146b. An n-channel bias BIASNC is applied to the n-channel portion of the circuit 140b at n-channel transistors 148b, 148b.

Regardless of what circuitry is used as the voltage-to-current converter 140, the voltage-to-current converter 140 should be designed to ensure the stability of the closed-loop boosted output described above with reference to FIG. 2.

Figure 4:
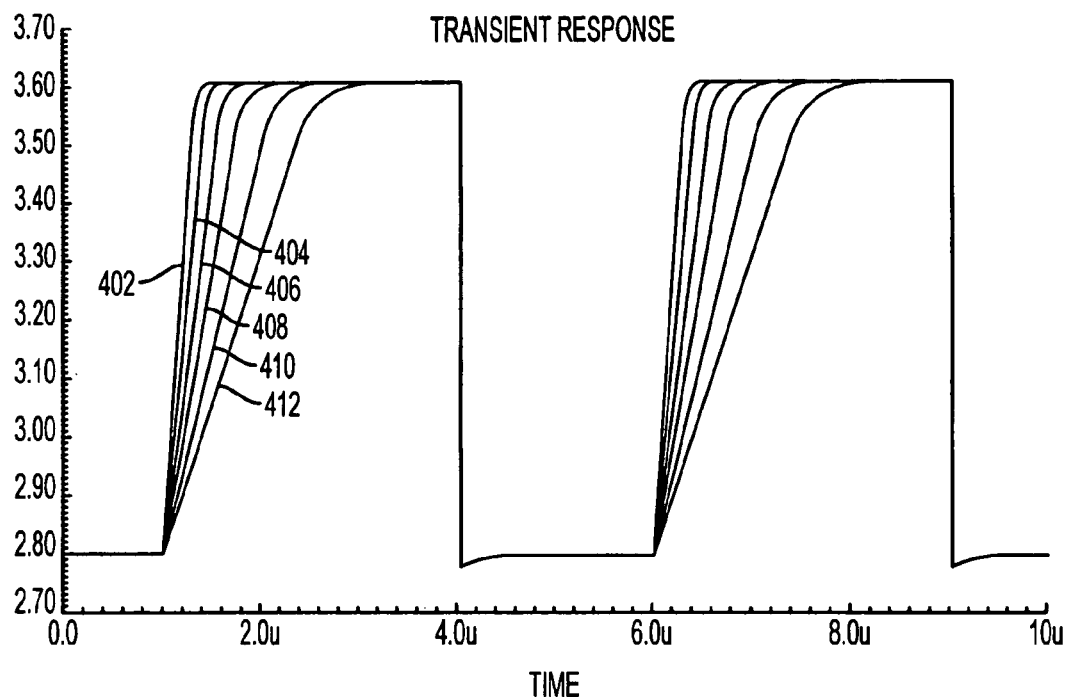
FIGS. 4 and 5 are exemplary response curves depicting a simulation of the operation of the boosting circuit illustrated in FIG. 2.
Figure 5:
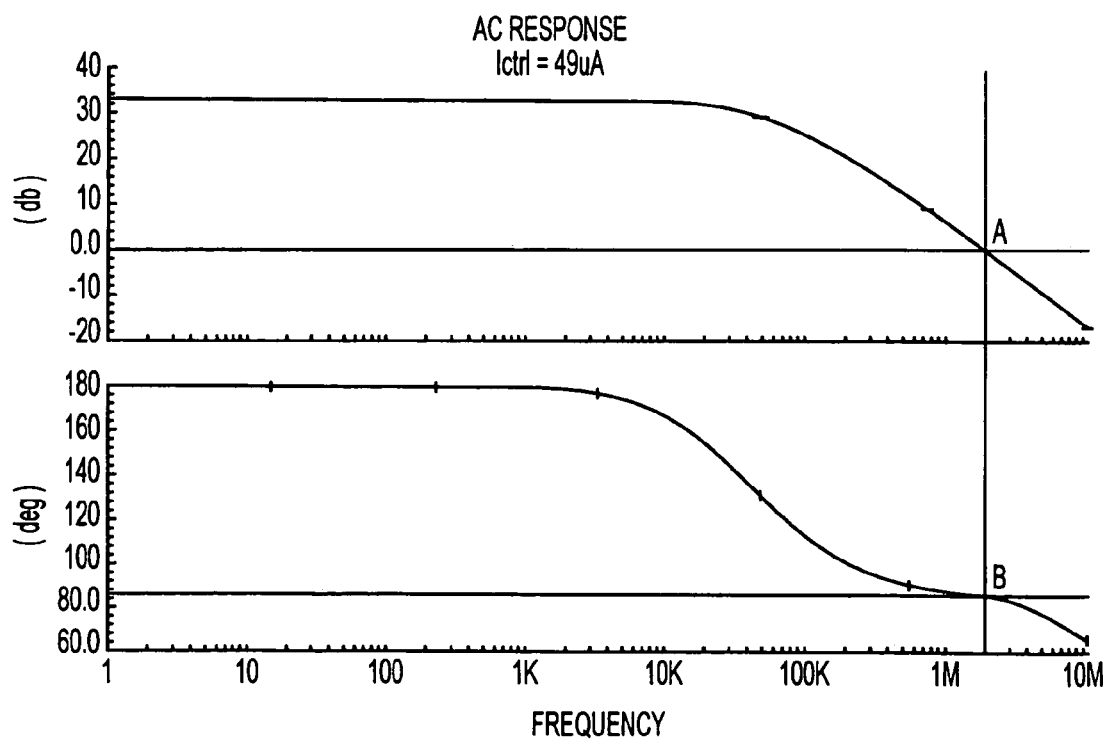

FIGS. 4 and 5 are exemplary response curves depicting a simulation of the operation of the boosting circuit illustrated in FIG. 2. The inventor conducted a simulation to verify the operation of the invention. In the simulation, the dimensions for the two p-channel transistors 144, 146 were 100 μm/1 μm and the dimensions for the two n-channel transistors 148, 150 were 50 μm/1 μm. The capacitances of the boosting capacitor 114 (C_boosting) was 90 pF, parasitic capacitor 116 (C_parasitic) was 3 pF, load capacitor 116 (C_load) was 30 pF and the tracking capacitor 120 (C_tracking) was 9 pF. The switches 132, 134 were implemented using a 5 μm/1 μm NMOS transistor and a 20 μm/1 μm NMOS transistor, respectively. The pre-charge circuit 112 pre-charged the capacitors 114, 116, 118, 120 to 2.8V, which is the rail voltage. The reference voltage Va was set to 0.810V. It should be noted that these dimensions and settings are exemplary and developed for the simulation; thus, the invention is not limited to the simulation dimensions and settings.

The value of the control current Ictrl was varied during the simulation. Line 402 represents the response curve using a control current Ictrl set to 100 µA. Line 404 represents the response curve using a control current Ictrl set to 70 µA. Line 406 represents the response curve using a control current Ictrl set to 40 µA. Line 408 represents the response curve using a control current Ictrl set to 35 µA. Line 410 represents the response curve using a control current Ictrl set to 25 µA. Line 412 represents the response curve using a control current Ictrl set to 18 µA. The output node (i.e., node D of FIG. 2) is labeled "RST" in the simulation to simulate the situation of boosting a reset control signal for an imager pixel (described below with respect to FIG. 6).

As can be seen from the curves 402–412 in FIG. 4, the rising time of the output RST (from 2.8V to 2.8V+Va) can be controlled by varying the control current Ictrl. In the simulation, the rising time was controlled from 221 nsec to 1221 nsec when the control current Ictrl was varied from 100 µA to 18 µA. The boosted voltage at the output node RST was 3.607V, which is 0.807V above the reference voltage Va 2.8V. That is, the voltage at the output node RST was substantially equal to Vprecharge (2.8V)+Va (0.810V). This verifies that the closed-loop control of the invention effectively ensures the accuracy of the boosting and, in addition, the slew rate of the boosting can be effectively controlled by the control current Ictrl.

FIG. 5 illustrates the closed-loop alternating current response when the control current Ictrl is set to 49 µA and the voltage-to-current converter has the construction illustrated in FIG. 3. As can be seen from the curves, since the converter 140 (FIGS. 2 and 3) used in the simulation is a common-source differential-input transistor pair with a single-ended current output, the phase margin can be as good as approximately 86 degrees (without any further compensation); this guarantees that the closed-loop response and final output are stable.

Figure 6:
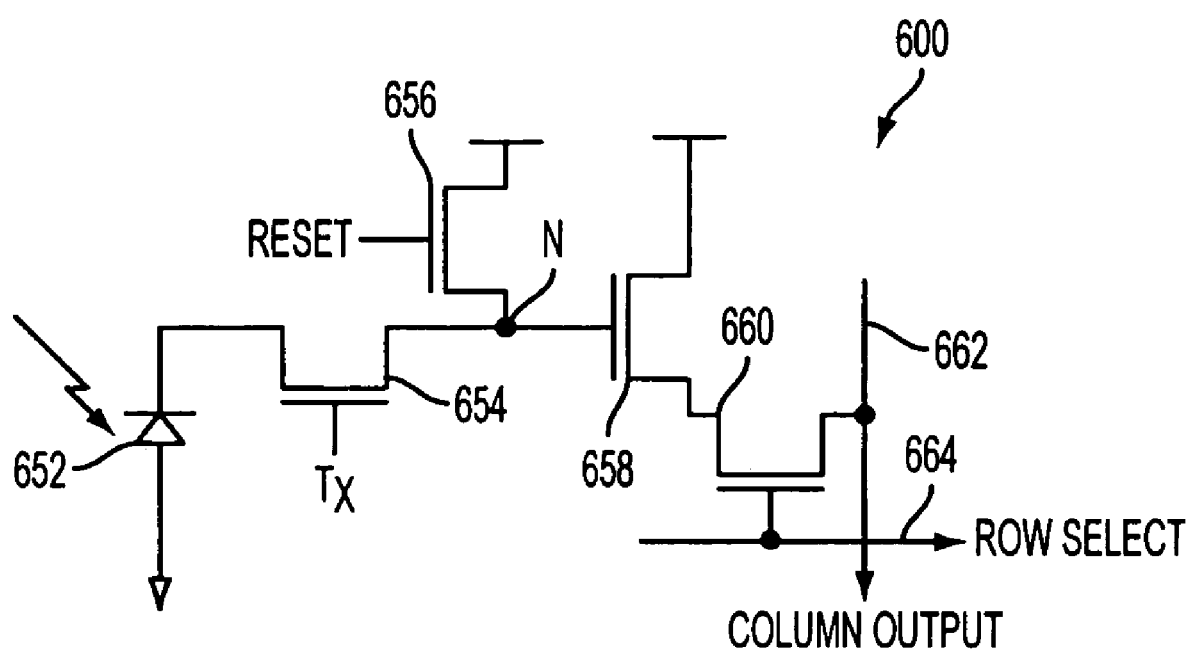
FIG. 6 illustrates an exemplary imager pixel cell that may utilize a boosted output voltage from the closed-loop high voltage boosting circuit constructed in accordance with the invention.

FIG. 6 illustrates an exemplary imager pixel cell 600 that may utilize a boosted output voltage from a closed-loop high voltage boosting circuit 110 (FIG. 2) constructed in accordance with the invention. The boosted voltage may be used as a control voltage for various gates in the pixel 600 (discussed below). The boosted voltage may also be used as the supply voltage to the pixel (sometimes referred to as the array-pixel voltage) or any other voltage required by the pixel 600.

The pixel 600 includes a photosensor 652 (e.g., photodiode, photogate, etc.), floating diffusion node N, transfer transistor 654, reset transistor 656, source follower transistor 658 and row select transistor 660. The photosensor 652 is connected to the floating diffusion node N by the transfer transistor 654 when the transfer transistor 654 is activated by a transfer gate control signal TX.

The reset transistor 656 is connected between the floating diffusion node N and an array pixel supply voltage. A reset control signal RESET is used to activate the reset transistor 656, which resets the photosensor 652 and floating diffusion node N as is known in the art. It is often desirable that the reset control signal RESET be a boosted voltage signal to ensure that the pixel 600 is fully reset regardless of unknown process, operating voltage or temperature variations. Thus, in an embodiment of the invention the reset control signal RESET is boosted by the boosting circuit 110 (FIG. 2) of the invention.

The source follower transistor 658 has its gate connected to the floating diffusion node N and is connected between the array pixel supply voltage and the row select transistor 660. The source follower transistor 658 converts the stored charge at the floating diffusion node N into an electrical output voltage signal. The row select transistor 660 is controllable by a row select signal ROW SELECT for selectively connecting the source follower transistor 658 and its output voltage signal to a column line 662 of a pixel array.

It should be appreciated that the illustrated pixel 600 is an example of the type of pixel that may be used with the invention and that the invention is not limited to use with a pixel cell or a particular configuration of a pixel cell. Moreover, the boosting circuit 110 (FIG. 2) of the invention could be used to boost the voltage of the transfer gate control signal TX or the row select signal ROW SELECT if so desired, and is not limited to generating a boosted reset control signal RESET.

Figure 7:
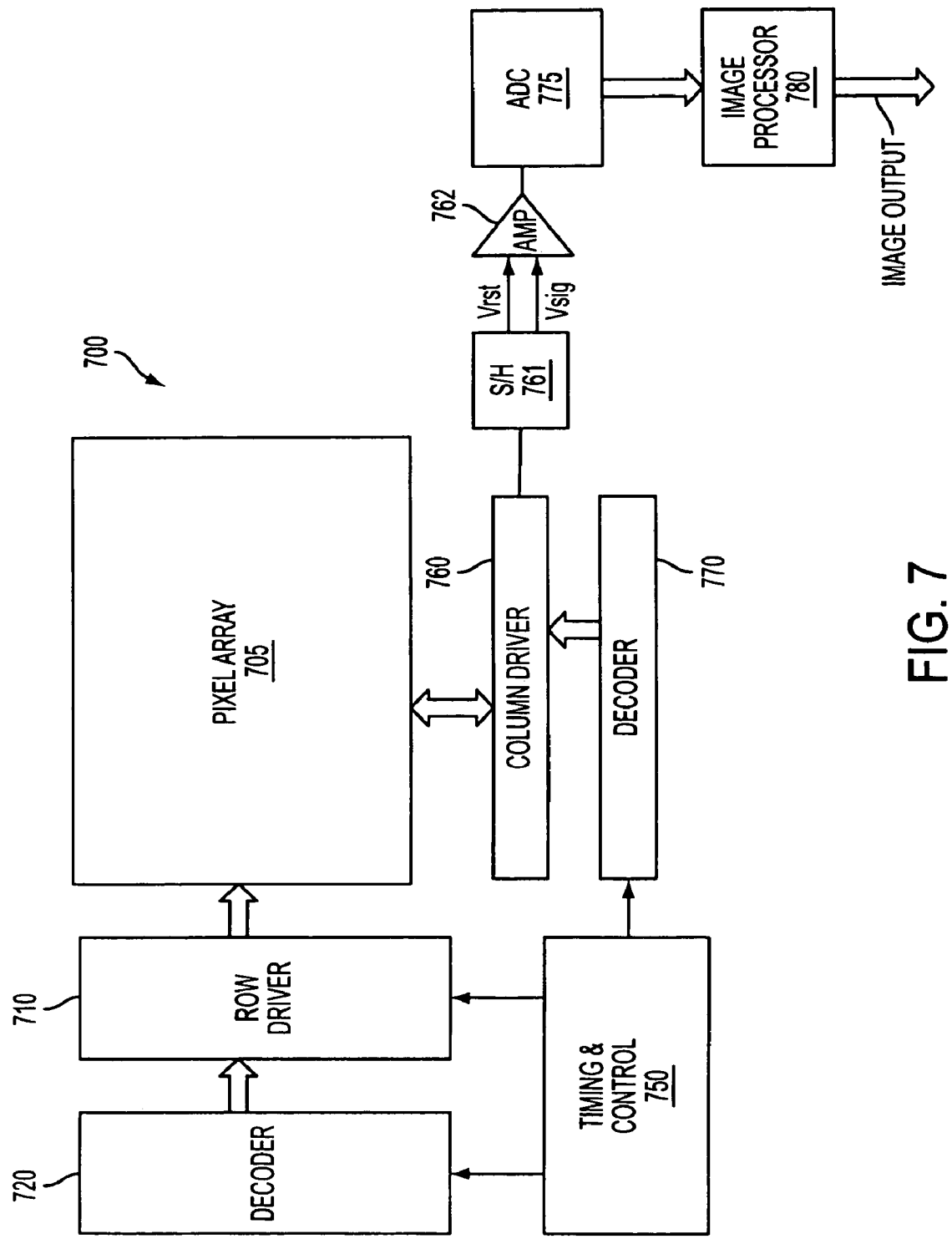
FIG. 7 illustrates an exemplary imager that may utilize a boosted output voltage from the closed-loop high voltage boosting circuit constructed in accordance with the invention.

FIG. 7 illustrates an exemplary imager 700 that may utilize a boosted output voltage from the closed-loop high voltage boosting circuit 110 (FIG. 2) constructed in accordance with the invention. The Imager 700 has a pixel array 705 comprising pixels constructed as described above with respect to FIG. 6, or using other pixel architectures. In the illustrated exemplary embodiment, the pixels in array 705 have reset control signals RESET that are boosted by the boosting circuit 110 (FIG. 2) constructed in accordance with the invention. In other embodiments, the pixels in array 705 have boosted transfer gate control signals TX and/or row select signals ROW SELECT. Moreover, a boosted voltage may be used as a supply voltage or other voltage required by the imager 700 or its pixels.

Row lines are selectively activated by a row driver 710 in response to row address decoder 720. A column driver 760 and column address decoder 770 are also included in the imager 700. The imager 700 is operated by the timing and control circuit 750, which controls the address decoders 720, 770. The control circuit 750 also controls the row and column driver circuitry 710, 760.

A sample and hold circuit 761 associated with the column driver 760 reads a pixel reset signal Vrst and a pixel image signal Vsig for selected pixels. A differential signal (Vrst-Vsig) is produced by differential amplifier 762 for each pixel and is digitized by analog-to-digital converter 775 (ADC). The analog-to-digital converter 775 supplies the digitized pixel signals to an image processor 780 which forms a digital image.

Figure 8:
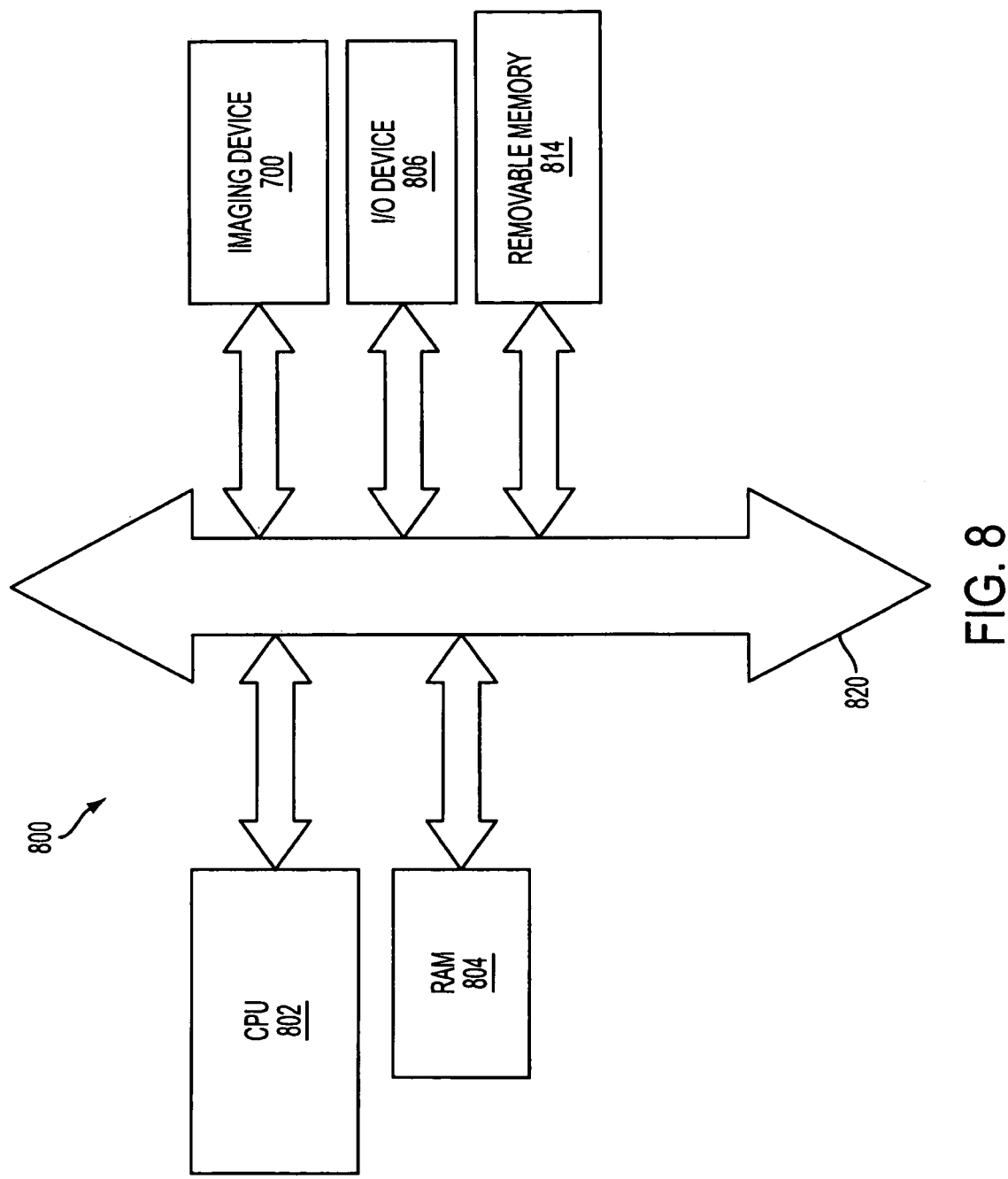
FIG. 8 shows a processor system incorporating at least one imager constructed in accordance with an embodiment of the invention.

FIG. 8 shows system 800, a typical processor system modified to include an imager device 700 (FIG. 7) of the invention. The processor-based system 800 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 800, for example a camera system, generally comprises a central processing unit (CPU) 802, such as a microprocessor, that communicates with an input/output (I/O) device 806 over a bus 820. Imaging device 700 also communicates with the CPU 802 over the bus 820. The processor-based system 800 also includes random access memory (RAM) 804, and can include removable memory 814, such as flash memory, which also communicate with the CPU 802 over the bus 820. The imaging device 700 may be combined with a processor, such as a CPU, digital signal processor, or microprocessor, with or without memory storage on a single integrated circuit or on a different chip than the processor.

It should be appreciated that other embodiments of the invention include a method of manufacturing the circuits 140, 140a, 140b of the invention as illustrated in FIGS. 2, 3, 9 and 10. For example, in one exemplary embodiment, a method of manufacturing a boosting circuit would include the steps of providing a voltage-to-current converter circuit; connecting a first input of the voltage-to-current converter to a reference voltage; providing a capacitive boosting circuit; connecting an input of the capacitive boosting circuit to an output of the voltage-to-current converter circuit; connecting the input of the capacitive boosting circuit to a pre-charge voltage source; and connecting an output of the capacitive boosting circuit to a second input of the voltage-to-current converter circuit.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A voltage boosting circuit comprising:
   a first circuit, said first circuit having a first input connected to a reference voltage and a first output; and
   a second circuit connected to receive the first output and a pre-charge voltage, said second circuit outputting a boosted output voltage on an output node based on the pre-charge voltage and the first output, said second circuit having a second node connected to a second input of the first circuit, said first circuit using a voltage on the second node and the reference voltage to generate the first output,
   wherein said second circuit comprises a tracking capacitor connected between the output and second nodes, said tracking capacitor producing the voltage at the second node.

2. The voltage boosting circuit of claim 1, wherein the voltage on said second node is indicative of the boosted output voltage.

3. The voltage boosting circuit of claim 1, wherein the voltage on said second node is indicative of a difference between the boosted output voltage and the pre-charge voltage.

4. The voltage boosting circuit of claim 1, wherein the first output is a current based on a difference between the boosted output voltage and the reference voltage.

5. A voltage boosting circuit comprising:
   a first circuit, said first circuit having a first input connected to a reference voltage and a first output; and
   a second circuit connected to receive the first output and a pre-charge voltage, said second circuit outputting a boosted output voltage on an output node based on the pre-charge voltage and the first output, said second circuit having a second node connected to a second input of the first circuit, said first circuit using a voltage on the second node and the reference voltage to generate the first output, said second circuit comprising a first capacitor connected between said pre-charge voltage and a third node connected to the first output and a second capacitor connected between the output node and the second node;
   a first switch connected between the third node and a ground potential; and
   a second switch connected between the second node and the ground potential,
   wherein in a pre-charge phase, said switches are closed to allow the capacitors to be pre-charged to the pre-charge voltage.

6. The voltage boosting circuit of claim 5, wherein in a boosting phase, said switches are open, preventing the capacitors from being pre-charged to the pre-charge voltage, said first capacitor being boosted by the first output to cause the boosted output voltage to be present at said output node.

7. A voltage boosting circuit comprising:
   a first circuit, said first circuit having a first input connected to receive a reference voltage, said first circuit having a first output; and
   a second circuit connected to receive the first output and a pre-charge voltage, said second circuit adapted to output a boosted output voltage on an output node based on a received pre-charge voltage and first output, said second circuit having a second node connected to a second input of the first circuit, said first circuit being adapted to use a voltage on the second node and the reference voltage to generate the first output,
   wherein said first circuit comprises a voltage-to-current converter circuit and said first output is a current based on a difference between the voltage on the second node and the reference voltage.

8. A voltage boosting circuit comprising:
   a first circuit, said first circuit having a first input connected to receive a reference voltage, said first circuit having a first output; and
   a second circuit connected to receive the first output and a pre-charge voltage, said second circuit adapted to output a boosted output voltage on an output node based on a received pre-charge voltage and first output, said second circuit having a second node connected to a second input of the first circuit, said first circuit being adapted to use a voltage on the second node and the reference voltage to generate the first output,
   wherein said first circuit comprises:
   a current source adapted to output a control current; and
   a differential circuit having a first input connected to receive the reference voltage and a second input connected to receive the voltage at the second node, said differential circuit having a common-source output for said first output, said first output being controlled by the control current and having a value based on a difference between the voltage on the second node and the reference voltage.

9. The voltage boosting circuit of claim 8, wherein said differential circuit comprises a differential transistor input pair.

10. The voltage boosting circuit of claim 8, wherein said differential circuit comprises cascaded transistors.

11. The voltage boosting circuit of claim 8, wherein said current source controls a rising time of the boosted output voltage.

12. A voltage boosting circuit comprising:
   a first circuit, said first circuit having a first input connected to receive a reference voltage, said first circuit having a first output; and
   a second circuit connected to receive the first output and a pre-charge voltage, said second circuit adapted to output a boosted output voltage on an output node based on a received pre-charge voltage and first output, said second circuit having a second node connected to a second input of the first circuit, said first circuit being adapted to use a voltage on the second node and the reference voltage to generate the first output, wherein said first circuit comprises:

a current source outputting a control current; and an integrator circuit having a first input connected to the reference voltage and a second input connected to the voltage at the second node, said first output being controlled by the control current and having a value based on a difference between the voltage on the second node and the reference voltage.

13. The voltage boosting circuit of claim 12, wherein said current source controls a rising time of the boosted output voltage.

14. A pixel cell for an imager, said pixel cell comprising:

a first circuit element connected to a voltage; and a voltage boosting circuit outputting said voltage to said first circuit element, said boosting circuit comprising:

a first circuit, said first circuit having a first input connected to a reference voltage and a first output; and a second circuit connected to receive the first output and a pre-charge voltage, said second circuit outputting a boosted output voltage on an output node based on the pre-charge voltage and the first output, said second circuit having a second node connected to a second input of the first circuit, said first circuit using a voltage on the second node and the reference voltage to generate the first output, wherein said first circuit comprises a voltage-to-current converter circuit and said first output is a current based on a difference between the voltage on the second node and the reference voltage.

15. The pixel cell of claim 14, wherein the voltage on said second node is indicative of the boosted output voltage.

16. The pixel cell of claim 14, wherein the voltage on said second node is indicative of a difference between the boosted output voltage and the pre-charge voltage.

17. The pixel cell of claim 14, wherein the first output is a current based on a difference between the boosted output voltage and the reference voltage.

18. A pixel cell for an imager, said pixel cell comprising:

a first circuit element connected to a voltage line; and a voltage boosting circuit adapted to output a voltage on the line to said first circuit element, said boosting circuit comprising:

a first circuit, said first circuit having a first input connected to receive a reference voltage, said first circuit having a first output; and a second circuit connected to receive the first output and a pre-charge voltage, said second circuit adapted to output a boosted output voltage on an output node based on the pre-charge voltage and the first output, said second circuit having a second node connected to a second input of the first circuit, said first circuit adapted to use a voltage on the second node and the reference voltage to generate the first output, wherein said second circuit comprises a tracking capacitor connected between the output and second nodes, said tracking capacitor producing the voltage at the second node.

19. A pixel cell for an imager, said pixel cell comprising:

a first circuit element connected to a voltage; and a voltage boosting circuit outputting said voltage to said first circuit element, said boosting circuit comprising:

a first circuit, said first circuit having a first input connected to a reference voltage and a first output;

a second circuit connected to receive the first output and a pre-charge voltage, said second circuit outputting a boosted output voltage on an output node based on the pre-charge voltage and the first output, said second circuit having a second node connected to a second input of the first circuit, said first circuit using a voltage on the second node and the reference voltage to generate the first output, said second circuit comprising a first capacitor connected between said pre-charge voltage and a third node connected to the first output and a second capacitor connected between the output node and the second node;

a first switch connected between the third node and a ground potential; and a second switch connected between the second node and the ground potential, wherein in a pre-charge phase, said switches are closed to allow the capacitors to be pre-charged to the pre-charge voltage.

20. The pixel cell of claim 19, wherein in a boosting phase, said switches are open, preventing the capacitors from being pre-charged to the pre-charge voltage, said first capacitor being boosted by the first output to cause the boosted output voltage to be present at said output node.

21. A pixel cell for an imager, said pixel cell comprising:

a first circuit element connected to a voltage; and a voltage boosting circuit outputting said voltage to said first circuit element, said boosting circuit comprising:

a first circuit, said first circuit having a first input connected to a reference voltage and a first output; and a second circuit connected to receive the first output and a pre-charge voltage, said second circuit outputting a boosted output voltage on an output node based on the pre-charge voltage and the first output, said second circuit having a second node connected to a second input of the first circuit, said first circuit using a voltage on the second node and the reference voltage to generate the first output, wherein said first circuit comprises:

a current source outputting a control current; and a differential circuit having a first input connected to the reference voltage and a second input connected to the voltage at the second node, said differential circuit having a common-source output for said first output, said first output being controlled by the control current and having a value based on a difference between the voltage on the second node and the reference voltage.

22. The pixel cell of claim 21, wherein said differential circuit comprises a differential transistor input pair.

23. The pixel cell of claim 21, wherein said differential circuit comprises cascaded transistors.

24. The pixel cell of claim 21, wherein said current source controls a rising time of the boosted output voltage.

25. A pixel cell for an imager, said pixel cell comprising:

a first circuit element connected to a voltage; and a voltage boosting circuit outputting said voltage to said first circuit element, said boosting circuit comprising:

a first circuit, said first circuit having a first input connected to a reference voltage and a first output; and a second circuit connected to receive the first output and a pre-charge voltage, said second circuit outputting a boosted output voltage on an output node based on the pre-charge voltage and the first output, said second circuit having a second node connected to a second input of the first circuit, said first circuit using a voltage on the second node and the reference voltage to generate the first output, wherein said first circuit comprises:
a current source outputting a control current; and
an integrator circuit having a first input connected to the reference voltage and a second input connected to the voltage at the second node, said first output being controlled by the control current and having a value based on a difference between the voltage on the second node and the reference voltage.

26. The pixel cell of claim 25, wherein said current source controls a rising time of the boosted output voltage.

27. The pixel cell of claim 14, wherein said first circuit element comprises a reset transistor.

28. The pixel cell of claim 14, wherein said first circuit element comprises a row select transistor.

29. The pixel cell of claim 14, wherein said first circuit element comprises a transfer transistor.

30. The pixel of claim 14, wherein the boosted output voltage is a voltage source of the pixel.

31. An imager comprising:
a pixel cell, said pixel cell comprising a first circuit element connected to a boosted voltage, and a voltage boosting circuit outputting said boosted voltage to said first transistor, said boosting circuit comprising:
  a first circuit, said first circuit having a first input connected to a reference voltage and a first output; and
  a second circuit connected to receive the first output and a pre-charge voltage, said second circuit outputting a boosted output voltage on an output node based on the pre-charge voltage and the first output, said second circuit having a second node connected to a second input of the first circuit, said first circuit using a voltage on the second node and the reference voltage to generate the first output,
  wherein said second circuit comprises a tracking capacitor connected between the output and second nodes, said tracking capacitor producing the voltage at the second node.

32. A method of manufacturing a voltage boosting circuit, said method comprising:
providing a voltage-to-current converter circuit;
connecting a first input of the voltage-to-current converter to a reference voltage;
providing a capacitive boosting circuit;
connecting an input of the capacitive boosting circuit to an output of the voltage-to-current converter circuit;
connecting the input of the capacitive boosting circuit to a pre-charge voltage source; and
connecting an output of the capacitive boosting circuit to a second input of the voltage-to-current converter circuit.

33. The method of claim 32, wherein the capacitive boosting circuit comprises a tracking capacitor.

34. The method of claim 32, wherein said step of providing a capacitive boosting circuit comprises:
providing a first capacitor connected between the pre-charge voltage source and a node connected to the output of the voltage-to-current converter; and
providing a second capacitor connected between an output node and a node connected to the second input of the voltage-to-current converter.

35. The method of claim 32, wherein said step of providing a voltage-to-current converter comprises:
providing a current source outputting a control current; and
providing an integrator circuit having a first input connected to the reference voltage and a second input connected to the output of the capacitive boosting circuit.

36. The method of claim 32, wherein said step of providing a voltage-to-current converter comprises: providing a current source outputting a control current; and
providing a differential circuit having a first input connected to the reference voltage and a second input connected to the output of the capacitive boosting circuit.

* * * * *

UNITED STATES PATENT AND TRADEMARK OFFICE
CERTIFICATE OF CORRECTION

PATENT NO. : 7,184,284 B2
APPLICATION NO. : 10/811995
DATED : February 27, 2007
INVENTOR(S) : Hai Yan Page 1 of 1

It is certified that error appears in the above-identified patent and that said Letters Patent is hereby corrected as shown below:

Col. 1, line 45, "Vprechage" should read --Vprecharge--;

Col. 3, line 5, "node B. 22 A first" should read --node B.

A first--;

Col. 3, line 15, "140. 23 When" should read --140.

When--.

Col. 3, line 37, "were" should read --where--; and

Col. 4. line 47, "148b" should read --150b--.

Signed and Sealed this

Eighth Day of May, 2007

JON W. DUDAS
*Director of the United States Patent and Trademark Office*